United States Patent Office
3,009,003
Patented Nov. 14, 1961

3,009,003
ALKYLATION OF ALKYLATABLE COMPOUNDS
Louis Schmerling, Riverside, Ill., assignor, by mesne assignments, to Universal Oil Products Company, Des Plaines, Ill., a corporation of Delaware
No Drawing. Filed July 27, 1956, Ser. No. 600,408
20 Claims. (Cl. 260—671)

This invention relates to a process for the alkylation of an alkylatable compound in the presence of a novel catalyst. More particularly, this invention relates to the alkylation of an alkylatable hydrocarbon with an alkylating agent at alkylating conditions in the presence of a catalyst comprising a titanium polyhalide and aluminum, boron, zirconium or iron.

An object of this invention is to produce alkylated compounds, and particularly to produce alkylated hydrocarbons. A specific object of this invention is the production of substantially saturated gasoline boiling range paraffinic hydrocarbons having high antiknock values which may be utilized as such or as components of gasoline suitable for use in airplane and automobile engines. Another specific object of this invention is the production of alkylated aromatic hydrocarbons which may be utilized as such or as components of gasoline suitable for use in airplane and automobile engines. A still further object of this invention is the production of alkylated aromatic compounds useful per se or as intermediates in the production of plastics, resins, and other organic materials. Thus, a further specific object of this invention is the production of cumene by the alkylation of benzene with propylene in the presence of a novel catalyst, which cumene product may then be oxidized to form cumene hydroperoxide which may be decomposed into phenol and acetone. Also, another object of this invention is to furnish a process for the alkylation of p-cresol with tertiary butyl alcohol to form 2,6-di-tert-butyl-4-methylphenol which is a very effective antioxidant for preventing the deterioration of organic substances due to oxygen. Other objects of this invention will be noted hereinafter as part of the specification and accompanying examples.

Numerous catalysts have been proposed for the alkylation of alkylatable compounds with alkylating agents including liquid catalysts such as sulfuric acid, phosphoric acid, fluorosulfonic acid, chlorosulfonic acid, hydrogen fluoride, etc., and solid catalysts such as aluminum chloride, aluminum bromide, metal oxides, metal sulfides, clays, etc. Each of the prior art catalysts has suffered from at least one inherent disadvantage and it is a further object of this invention to provide an alkylating catalyst which can be used in systems and in reactions where prior art catalysts are unsatisfactory. Use of the novel catalyst composition of the present invention overcomes disadvantages which are well known to one skilled in the art.

One embodiment of the invention resides in a process for the alkylation of an alkylatable compound which comprises alkylating said compound with an alkylating agent in the presence of a catalyst consisting of a titanium polyhalide in which the halogen has an atomic weight of from 35 to 80 and a metal selected from the group consisting of aluminum, boron, iron and zirconium at alkylating conditions, and recovering the resultant alkylated compound.

A further embodiment of the invention resides in the alkylation of an alkylatable hydrocarbon which comprises alkylating said hydrocarbon with an alkylating agent in the presence of a catalyst consisting of a titanium polyhalide in which the halogen has an atomic weight of from 35 to 80 and a metal selected from the group consisting of aluminum, boron, iron and zirconium at alkylating conditions, and recovering the resultant alkylated hydrocarbon.

A specific embodiment of the invention is found in the alkylation of toluene which comprises alkylating said toluene with an alkylating agent in the presence of a catalyst consisting of a titanium polyhalide in which the halogen has an atomic weight of from 35 to 80 and a metal selected from the group consisting of aluminum, boron, iron and zirconium at alkylating conditions, and recovering the resultant alkylated toluene.

A more specific embodiment of the invention is found in a process for the alkylation of toluene which comprises alkylating said toluene with ethylene in the presence of a catalyst consisting of titanium tetrachloride and metallic aluminum at alkylating conditions, and recovering the resultant ethyltoluenes.

Other objects and embodiments referring to alternative alkylatable compounds and alkylating agents will be found in the following further detailed description of the invention.

For the purposes of this specification, boron which is usually considered to be a metalloid will be termed a metal.

It has now been discovered that a catalyst composition useful for the alkylation of alkylatable compounds comprises metallic aluminum, boron, iron or zirconium and a titanium polyhalide. As will be illustrated in the examples appended to the present specification, the catalyst of the present invention gives results different than those obtained by the use of a titanium polyhalide alone. The titanium polyhalide utilized in this catalyst composition may be selected from the group comprising titanium dichloride, titanium trichloride, titanium tetrachloride, titanium dibromide, titanium tribromide, titanium tetrabromide, titanium diiodide, titanium triiodide, titanium tetraiodide, titanium difluoride, titanium trifluoride, or titanium tetrafluoride. The preferred titanium polyhalides comprise the tri and tetrachlorides and bromides due to their greater availability and relatively lower cost. While the various titanium polyhalides can be used interchangeably, the results obtained by the utilization of any specific one are not necessarily equivalent to the results obtained with any other and it has been found necessary to alter the alkylating conditions as the activity of the particular titanium polyhalide which has been selected for the catalyst varies in combination with the metallic aluminum, boron, iron or zirconium. An additional feature of the present invention is that the catalyst may be utilized as a solid mass or as a composite with a suitable supporting material. In some cases, the titanium polyhalide is soluble in the reactants utilized and thus the reactants, including the dissolved polyhalide, can be passed over a solid bed of metallic aluminum, boron, iron or zirconium in a continuous type of operation.

The metallic aluminum, boron, iron or zirconium may be utilized in various forms such as granules, turnings, foil or heavier sheets, cylinders, etc. Thus, it is contemplated that a solution of the titanium polyhalide in the alkylatable compound and the alkylating agent (either in gaseous or liquid state) may be passed through an aluminum, iron or zirconium tube which may be surrounded, if the reaction pressures so necessitate, by a steel piping, said tube being heated to the required temperature.

In some instances it may be desirable to add a hydrogen halide corresponding to or different from the titanium polyhalide selected, in addition to the present catalyst, to obtain the particular type of alkylation process desired. Such hydrogen halides include hydrogen chloride, hydrogen bromide, and in some cases, hydrogen iodide, the hydrogen chloride and hydrogen bromide comprising the preferred hydrogen halides. It is understood furthermore that certain halogen containing compounds which release hydrogen halide under the reaction conditions of the present process may be utilized in place or along with the hydrogen halide. Examples of suitable halogen containing compounds are the alkyl halides, including alkyl chlorides, alkyl bromides and alkyl iodides. Specific alkyl halides include ethyl chloride, propyl chlorides, butyl chlorides, pentyl chlorides, hexyl chlorides, etc., ethyl bromide, propyl bromides, butyl bromides, pentyl bromides, etc., ethyl iodide, propyl iodides, butyl iodides, pentyl iodides, etc., or mixtures thereof. It is understood that polyhaloalkane compounds, halocyclic compounds and/or polyhalocyclic compounds may be utilized in some cases.

As hereinbefore set forth, the novel catalyst for the alkylation of alkylatable compounds in the reaction process of the present invention comprises a titanium polyhalide and metallic aluminum, boron, iron or zirconium. As will be illustrated in the following examples, the titanium polyhalide alone is not a catalyst for certain alkylation reactions and it is only the combination of the titanium polyhalide and metallic aluminum, boron, iron or zirconium which serves to catalyze these reactions. For example, titanium tetrachloride is not itself a catalyst for the alkylation of aromatic hydrocarbons; however, in combination with metallic aluminum, boron, iron or zirconium, alkylation takes place. The proportions of metallic aluminum or zirconium and titanium polyhalide may vary over a wide range as, for example, from about 0.1 to about 20 moles and even more of aluminum per mole of titanium polyhalide. The specific proportions will depend upon the particular titanium polyhalide utilized, such as a determination being well within the skill of a person experienced in this art.

As hereinabove set forth, the present invention relates to a process for the alkylation of an alkylatable compound with an alkylating agent at alkylating conditions in the presence of an alkylating catalyst comprising a titanium halide and metallic aluminum, boron, iron or zirconium. Many different classes of compounds can be alkylated by the process of this invention. Among such classes of compounds are paraffin hydrocarbons including isoparaffinic hydrocarbons and naphthenic hydrocarbons (the latter containing one or more alkyl groups), aromatic hydrocarbons, phenols, aromatic amines, aromatic halogen compounds, aromatic carboxylic acids, aromatic halides, and aromatic ketones. Among these classes of alkylatable compounds, hydrocarbons are preferred, and particularly, aromatic hydrocarbons are preferred. The remaining alkylatable compounds are further not necessarily equivalent so that different reaction conditions may be necessary to involve them in reaction with the alkylating agents hereinafter set forth in the presence of the novel catalyst of this invention.

Many paraffin hydrocarbons are utilizable as starting materials, that is, as alkylatable compounds, in the process of this invention. Suitable paraffin hydrocarbons include isobutane, isopentane, 2-methylpentane, 3-methylpentane, 2,3-dimethylbutane, 2-methylheptane, 3-methylheptane, etc. n-Paraffin hydrocarbons such as n-butane, n-pentane, n-hexane, etc. may also be used provided that the reaction conditions lead to their isomeriztion to isoparaffin hydrocarbons prior to alkylation. Since the catalyst of the present invention is extremely active, such combination isomerization-alkylation reactions are not surprising and thus within the generally broad scope of this invention. Isobutane is the isoparaffin commonly subjected to alkylation commercially, although higher molecular weight isoparaffins also react with alkylating agents under similar or modified conditions of operation to produce branched chain paraffinic hydrocarbons charged to the process. However, as the higher molecular weight isoparaffins such as isopentane, isohexane, etc., are themselves valuable constituents of gasoline, they are consequently used less commonly than isobutane as charging stocks for the alkylation process. Of the various naphthenic hydrocarbons which may be alkylated in the presence of the catalyst described herein to produce naphthenic hydrocarbons of more highly branched chain structure, methylcyclohexane, and its alkyl derivatives and homologs are commonly employed in such alkylation; alkylcyclopentanes and alkylcycloheptanes may also be utilized to advantage. The resulting alkylates are utilizable as constituents for high antiknock gasoline.

Many aromatic compounds are utilizable as alkylatable compound starting materials. Preferred aromatic compounds are aromatic hydrocarbons, and particularly monocyclic aromatic hydrocarbons, that is, benzene hydrocarbons. Suitable aromatic hydrocarbons include benzene, toluene, o-xylene, m-xylene, p-xylene, ethylbenzene, 1,2,3-trimethylbenzene, mesitylene, o-ethyltoluene, m-ethyltoluene, p-ethyltoluene, n-propylbenzene, cumene, etc. Higher molecular weight alkyl-aromatic hydrocarbons are also suitable such as those produced by the alkylation of aromatic hydrocarbons with olefinic polymers. Such products are referred to in the art as alkylate, and include hexylbenzene, hexyltoluene, nonylbenzene, nonyltoluene, dodecylbenzene, dodecyltoluene, etc. Very often alkylate is obtained as a high boiling fraction in which the alkyl group attached to the aromatic hydrocarbon varies in size from $C_9$ to $C_{18}$. Still other suitable utilizable aromatic hydrocarbons include those with two or more aryl groups such as diphenyl, diphenylmethane, triphenylmethane, fluorene, stilbene, etc. Examples of suitable alkylatable aromatic compounds which contain condensed benzene rings include naphthalene, anthracene, phenanthrene, naphthacene, rubrene, etc. Indene may also be used.

Furthermore, by the term alkylatable aromatic compound, is meant to include not only benzene derivatives, naphthalene derivatives and the like, but also all aromatic compounds containing a stable ring or nucleus such as is present in benzene, and which possess unsaturation in the sense that benzene does. Consequently, it can be seen that the term aromatic compound, in the sense in which it is used in this specification and the appended claims, includes not only carbocyclic compounds, but also heterocyclic compounds having a stable nucleus. The carbocyclic compounds may have a benzene, naphthalene, anthracene, etc., nucleus. The heterocyclic aromatic compounds may have a pyridine, furan, thiophene, pyrrole, pyrazole, etc., nucleus. In addition, the aromatic compounds contemplated for use in my process may contain both a carbocyclic and a heterocyclic ring such as is found in indole and carbazole. Also, the aromatic compounds may contain both a benzene nucleus and a saturated ring such as is found in tetralin and in indan.

Suitable alkylating agents which may be charged in this process are olefin-acting compounds including monoolefins, diolefins, and polyolefins, as well as alkyl halides and polyhaloalkanes (the preferred halogen being chlorine and bromine). The preferred olefin-acting compounds are olefinic hydrocarbons which comprise monoolefins having one double bond per molecule and polyolefins which have more than one double bond per molecule. Monoolefins which may be utilized for alkyalting alkylatable compounds in the presence of a catalyst comprising a titanium polyhalide and metallic aluminum, boron, iron or zirconium are either normally gaseous or normally liquid and include ethylene, propylene, 1-butene, 2-butene, isobutylene, pentenes, hexenes and higher normally liquid olefins, the latter including various olefin polymers having from about 6 to about 18 carbon atoms per molecule. Cycloolefins such as cyclopentene, cyclohexene, and various alkylcycloolefins such as methylcyclopentene, methylcyclohexene, etc., and polycyclic olefins such as bicyclo[2.2.1]-2-heptene may also be utilized but generally not under the exact same conditions of operation applying to the noncyclic olefins. The polyolefinic hydrocarbons utilizable in the process of the present invention include conjugated diolefins such as butadiene and isoprene, as well as nonconjugated diolefins and other polyolefinic hydrocarbons containing more than two double bonds per molecule.

Alkylation of the above alkylatable compounds may also be effected in the presence of the hereinabove referred to catalyst by reacting alkylatable compounds, particularly alkylatable hydrocarbons, with certain substances capable of producing olefinic hydrocarbons, or intermediates which act as olefinic hydrocarbons, under the conditions of operation chosen for the process. Such latter substances include alkyl halides capable of undergoing dehydrohalogenation to form olefinic hydrocarbons contining at least two carbon atoms per molecule. The alkyl halides comprise a particularly desirable group of alkylating agents which act as olefins in admixture with alkylatable compounds in the presence of the catalyst of the present invention. Suitable alkyl halides include ethyl chloride, ethyl bromide, n-propyl chloride, n-propyl bromide, isopropyl chloride, isopropyl bromide, n-butyl chloride, n-butyl bromide, isobutyl chloride, isobutyl bromide, sec-butyl chloride, sec-butyl bromide, tert-butyl chloride, tert-butyl bromide, amyl chlorides, amyl bromides, etc., the latter including the various possible isomeric forms of such compounds. Methyl halides may also be used. Polyhaloalkanes which may be used include 1,3-dichloro-3-methylbutane, 1,1-dichloro-3,3-dimethylbutane, etc.

In accordance with the process of this invention, the alkylation of alkylatable compounds reaction to produce alkylated compounds of higher molecular weight than the compounds charged to the process is effected in the presence of the above-indicated catalysts at a temperature of from about room temperature to about 400° C. or higher, and preferably at a temperature from about 100° to about 300° C., although the exact temperature needed for a particular alkylation reaction will depend upon the specific reactants and catalyst employed.

The alkylation reaction is usually carried out at a pressure of from about substantially atmospheric to about 100 atmospheres, and preferably under sufficient pressure to maintain at least part of the reactants and the products in liquid phase. Referring to the alkylatable compound subjected to the alkylation reaction, it is preferable to have present from 1 to 10 or more, sometimes up to 20 molecular proportions of alkylatable compound per one molecular proportion of alkylating agent introduced thereto, particularly olefinic hydrocarbon. The higher molecular ratios of alkylatable compound to olefin are especially desirable when the olefin employed in the alkylation is a high molecular weight boiling generally higher than pentenes, since these olefins frequently undergo depolymerization prior to or substantially simultaneously with alkylation so that one molecular proportion of such an olefin can thus alkylate two or more molecular proportions of the alkylatable compound. The higher molecular ratios of alkylatable compound to olefin also tend to reduce the formation of polyalkylated products because of the operation of the law of mass action under these conditions. In some cases it may be desirable to maintain or employ an atmosphere of hydrogen within the reaction.

The process of this invention may be effected in any suitable manner and may comprise either a batch or a continuous type operation. The actual operation of the process admits of some modification depending upon the normal phase of the reacting constituents in such batch or continuous operation. In a batch type operation the alkylatable compound such as an aromatic hydrocarbon, for example, benzene, is placed in an appropriate apparatus such as a rotating autoclave and brought to a temperature and pressure within the approximate range hereinbefore specified in the presence of a catalyst consisting of a titanium polyhalide and metallic aluminum, boron, iron or zirconium. The alkylation of the alkylatable compound is effected by the gradual introduction under pressure of an alkylating agent such as an olefin in a manner so as to obtain contact between the alkylating agent, the catalyst and the alkylatable compound. In carrying out the reaction in such a batch type operation the amount of aluminum, boron, iron or zirconium utilized ranges from about 0.1 to about 10% by weight of the material to be alkylated. The amount of metallic aluminum, boron, iron or zirconium utilized in forming the catalyst of the present invention in relation to the amount of titanium polyhalide utilized has been set forth hereinabove. At the end of the desired residence time the apparatus is cooled to room temperature and the reaction product separated from any unreacted starting material by conventional means such as filtration, washing, fractional distillation, etc.

In another manner of operation, the alkylatable compound may be admixed with an alkylating agent such as an olefin at a suitable temperature, after which the catalyst consisting of a titanium polyhalide and metallic aluminum or zirconium is thereinafter added and the reaction of alkylation is induced by a sufficiently long contact time with the catalyst. The alkylation may be allowed to progress to different stages depending upon the desired contact time. In the case of the alkylation of benzene, the best products are obtained or produced by the condensation of equimolecular quantities of benzene and olefin. After the desired residence time has been completed the flask and contents thereof, if the same has been heated to a high temperature and pressure, are allowed to cool to room temperature, the excess pressure vented and the catalyst removed in any suitable manner such as by filtration and washing with water so as to purify the organic product layer, the latter then being subjected to fractionation for the recovery of the desired reaction products.

The process of this invention may also be effected in a continuous type operation. One type of such operation comprises a fixed bed type in which the alkylatable compound such as benzene or toluene containing dissolved therein a requisite amount of titanium polyhalide, may be pumped through a reactor containing the metallic aluminum, boron, iron or zirconium disposed in the form of a bed. The reactor may comprise an unpacked vessel or coil or may be packed with an adsorbent packing material such as dehydrated bauxite, firebrick, alumina and the like. The alkylating agent may be added to the alkylatable compound stream just prior to contact with the metallic aluminum or zirconium bed, or it may be introduced in multi-stages at various points in the metallic aluminum, boron, iron or zirconium bed. It is also contemplated within the scope of the present invention, when the titanium polyhalide utilized is insoluble in the compound to be alkylated, to dispose said titanium polyhalide along with the metallic aluminum or zirconium in a fixed bed for continuous type operation. The details of continuous process of this general character are familiar to those skilled in the alkylation art and any necessary additions or modification of the above general procedures will be more or less obvious and can be made without departing from the generally broad scope of this invention. For example, instead of utilizing an amount of catalyst based on the weight of compound to be alkylated, in continuous operation, the hourly liquid space velocity is varied within the limits hereinafter set forth so that satisfactory contact between the catalyst and the reactants is obtained. In processes of this general character, hourly liquid space velocities are normally in the range of from about 0.1 to about 10 or higher.

Another form of continuous process which may be used is the slurry type process in which the catalyst consisting of a mixture of a titanium polyhalide and metallic aluminum or zirconium is carried into the reactor as a slurry in the alkylatable compound.

The following examples are given to illustrate the process of the present invention which, however, are not intended to limit the generally broad scope of the present invention in strict accordance therewith.

Example I

A rotating autoclave of 850 cc. capacity was flushed with nitrogen. 205 g. of benzene, 3.5 g. of metallic aluminum in the form of cylindrical spirals which were made by rolling 6" squares of aluminum foil, and 2 g. of titanium tetrachloride were placed in a glass liner of the autoclave. The autoclave was sealed, flushed twice with nitrogen and then charged to an initial pressure of 60 atmospheres with ethylene. The autoclave was then slowly heated; there was a rapid adsorption of ethylene at a temperature of approximately 140–150° C. for about 3.5 hours. The reaction was continued for an additional 3 hours, upon completion of which time the autoclave was cooled to room temperature, the final pressure being 20 atmospheres at room temperature. The excess pressure was vented, and the reaction product withdrawn. The product consisted of 280 g. of a dark amber liquid containing some grease-like solid. In addition there was also a dark amber grease-like coating on the aluminum cylinders. The liquid was filtered, yielding 9.5 g. (after drying in air) of granular material. The liquid product from the filtration was subjected to fractional distillation, there being obtained 71 g. (25% of the theoretical yield based on the benzene charged) of ethylbenzene, 64 g. (18% yield) of diethylbenzene, 20 g. (4.7% yield) of triethylbenzene and 25 g. of higher boiling residue. In addition, the extraction of the aluminum cylinders containing the grease-like coating, and the granular material which was the precipitate obtained from the abovementioned filtration, with hot toluene in a Soxhlet extractor yielded granular material (soluble in hot toluene and insoluble in toluene at room temperature) which softened at about 150° C.

Example II

Little or no alkylation occurred under the same reaction conditions of Example I but in the absence of aluminum. 205 g. of benzene was placed in a glass liner of a rotating autoclave along with 2 g. of titanium tetrachloride. The liner was sealed in and, after flushing with nitrogen, ethylene was charged at an initial pressure of 65 atmospheres. The autoclave was heated to a temperature of 250° C. during approximately six hours. The autoclave was then cooled to room temperature, the final pressure being 41 atmospheres. The reaction product comprising 144 g. was distilled, the distillation disclosing the fact that the product consisted primarily of unreacted benzene, only 3 g. of a higher boiling residue being obtained.

Example III 206 g. of toluene along with 2 g. of titanium tetrachloride and 3 g. of metallic aluminum in the form of cylindrical spirals of aluminum foil were placed in a glass liner of a rotating autoclave. The liner was sealed in, the autoclave flushed twice with nitrogen and ethylene charged at an initial pressure of 56 atmospheres. The autoclave was heated to a temperature of 235° C. and the reaction maintained for approximately six hours. At the end of this time the autoclave was cooled to room temperature, the final pressure being 10 atmospheres. There was obtained 296 g. of liquid reaction product, which product was filtered and the filtrate subjected to fractional distillation. There was obtained a 27% yield of monoethyltoluene based on the toluene charged, 27% diethyltoluene, 4% of triethyl toluene, 7% of tetraethyltoluene and a small amount of a higher boiling residue.

Example IV 100 g. of benzene along with 2 g. of titanium tetrachloride and 10 g. of zirconium granules were placed in a glass liner of a rotating autoclave. The liner was sealed in, the autoclave flushed twice with nitrogen and ethylene was charged at an initial pressure of 40 atmospheres. The autoclave was heated to a temperature of 250° C. during 4 hours and maintained at that temperature for approximately 1.5 hours. At the end of this time the autoclave was cooled to room temperature, the final pressure being 20 atmospheres. There was obtained 118 g. of liquid and solid reaction product, said liquid product then being filtered from the solid (12 g., chiefly catalyst) and the filtrate subjected to fractional distillation. A 10% of the theoretical yield of monoethylbenzene (based on the benzene charged), a 4% of diethylbenzenes, and a small amount of a higher boiling residue was obtained.

Example V 100 g. of benzene and 2 g. of titanium tetrachloride along with 5 g. of boron powder were placed in a glass liner of a rotating autoclave. The liner was sealed in, the autoclave flushed twice with nitrogen and ethylene was charged at an initial pressure of 40 atmospheres. The autoclave was heated to a temperature of 250° C. during 5 hours, and maintained at that temperature for approximately 1.5 hours. At the end of this time the autoclave was cooled to room temperature, the final pressure being 32 atmospheres. The solid and liquid reaction product was filtered and the filtrate subjected to fractional distillation. A 3% of the theoretical yield of monoethylbenzene (based on the benzene charged) and a 4% yield of diethylbenzenes was obtained.

Example VI 100 g. of benzene, 2 g. of titanium tetrachloride and 10 g. of iron powder was placed in a glass liner of a rotating autoclave. The liner was sealed in, the autoclave flushed twice with nitrogen and ethylene charged at an initial pressure of 40 atmospheres. The autoclave was slowly heated to a temperature of 250° C. during a 5 hour period and maintained at that temperature for an additional 1.5 hours. At the end of this time the autoclave was cooled to room temperature, the final pressure being 20 atmospheres. The solid and liquid reaction product was recovered and the liquid product filtered from the solid. The filtrate was subjected to fractional distillation, a 16% of the theoretical yield of monoethylbenzene (based on the benzene charged) and a 4% yield of diethylbenzenes being recovered.

I claim as my invention:

1. A process for the alkylation of an alkylatable aromatic hydrocarbon which comprises alkylating said aromatic hydrocarbon with ethylene at alkylating conditions, in the presence of a catalyst consisting of a titanium polyhalide in which the halogen has an atomic weight of from 35 to 80 and a metal selected from the group consisting of aluminum, boron, iron and zirconium, and recovering the resultant alkylated aromatic hydrocarbon.

2. A process for the alkylation of an alkylatable paraffinic hydrocarbon which comprises alkylating said paraffinic hydrocarbon with ethylene at alkylating conditions, in the presence of a catalyst consisting of a titanium polyhalide in which the halogen has an atomic weight of from 35 to 80 and a metal selected from the group consisting of aluminum, boron, iron and zirconium, and recovering the resultant alkylated paraffinic hydrocarbon.

3. A process for the alkylation of benzene which comprises alkylating said benzene with ethylene at alkylating conditions, in the presence of a catalyst consisting of a titanium polyhalide in which the halogen has an atomic weight of from 35 to 80 and a metal selected from the group consisting of aluminum, boron, iron and zirconium, and recovering the resultant alkylated benzene.

4. A process for the alkylation of toluene which comprises alkylating said toluene with ethylene at alkylating conditions, in the presence of a catalyst consisting of a titanium polyhalide in which the halogen has an atomic weight of from 35 to 80 and a metal selected from the group consisting of aluminum, boron, iron and zirconium, and recovering the resultant alkylated toluene.

5. A process for the alkylation of isobutane which comprises alkylating said isobutane with ethylene at alkylating conditions, in the presence of a catalyst consisting of a titanium polyhalide in which the halogen has an atomic weight of from 35 to 80 and a metal selected from the group consisting of aluminum, boron, iron and zirconium, and recovering the resultant alkylated isobutane.

6. A process for the alkylation of an alkylcyclohexane which comprises alkylating said alkylcyclohexane with ethylene at alkylating conditions, in the presence of a catalyst consisting of a titanium polyhalide in which the halogen has an atomic weight of from 35 to 80 and a metal selected from the group consisting of aluminum, boron, iron and zirconium, and recovering the resultant alkylated alkylcyclohexane.

7. A process for the alkylation of an alkylatable hydrocarbon which comprises alkylating said hydrocarbon with ethylene at alkylating conditions, in the presence of a catalyst consisting of a titanium polyhalide in which the halogen has an atomic weight of from 35 to 80 and a metal selected from the group consisting of aluminum, boron, iron and zirconium, and recovering the resultant ethylated hydrocarbon.

8. A process for the alkylation of an alkylatable hydrocarbon which comprises alkylating said hydrocarbon with ethylene at alkylating conditions in the presence of a catalyst consisting of titanium trichloride and a metal selected from the group consisting of aluminum, boron, iron and zirconium and recovering the resultant alkylated hydrocarbon.

9. A process for the alkylation of an alkylatable hydrocarbon which comprises alkylating said hydrocarbon with ethylene at alkylating conditions in the presence of a catalyst consisting of titanium tetrachloride and a metal selected from the group consisting of aluminum, boron, iron and zirconium and recovering the resultant alkylated hydrocarbon.

10. A process for the alkylation of an alkylatable hydrocarbon which comprises alkylating said hydrocarbon with ethylene at alkylating conditions in the presence of a catalyst consisting of titanium tribromide and a metal selected from the group consisting of aluminum, boron, iron and zirconium and recovering the resultant alkylated hydrocarbon.

11. A process for the alkylation of an alkylatable hydrocarbon which comprises alkylating said hydrocarbon with ethylene at alkylating conditions in the presence of a catalyst consisting of titanium tetrabromide and a metal selected from the group consisting of aluminum, boron, iron and zirconium and recovering the resultant alkylated hydrocarbon.

12. A process for the alkylation of benzene which comprises alkylating said benzene with ethylene at alkylating conditions in the presence of a catalyst consisting of titanium tetrachloride and metallic aluminum and recovering the resultant ethylbenzenes.

13. A process for the alkylation of toluene which comprises alkylating said toluene with ethylene at alkylating conditions in the presence of a catalyst consisting of titanium tetrachloride and metallic aluminum and recovering the resultant ethyltoluenes.

14. A process for the alkylation of benzene which comprises alkylating said benzene with ethylene at alkylating conditions in the presence of a catalyst consisting of titanium tetrachloride and metallic zirconium and recovering the resultant ethylbenzenes.

15. A process for the alkylation of toluene which comprises alkylating said toluene with ethylene at alkylating conditions in the presence of a catalyst consisting of titanium tetrachloride and metallic zirconium and recovering the resultant ethyltoluenes.

16. A process for alkylating aromatic hydrocarbons which comprises alkylating said aromatic hydrocarbon with ethylene at a temperature of from about 150° C. to about 325° C. in the presence of a catalyst consisting of titanium tetrahalide and a metal selected from the group consisting of aluminum and boron and recovering the alkylated hydrocarbon so produced.

17. A process for alkylating an aromatic hydrocarbon which comprises alkylating said aromatic hydrocarbon with ethylene at alkylating conditions in the presence of titanium tetrahalide and a metal selected from the group consisting of aluminum and boron, and recovering the alkylated hydrocarbon so produced.

18. A process for alkylating an aromatic hydrocarbon which comprises alkylating said aromatic hydrocarbon with an olefin hydrocarbon having from 2 to 18 carbon atoms at alkylating conditions in the presence of, as catalyst, titanium tetrahalide and a metal selected from the group consisting of aluminum and boron.

19. A process for alkylating an aromatic hydrocarbon which comprises alkylating said aromatic hydrocarbon with an olefin hydrocarbon having from 2 to 18 carbon atoms at alkylating conditions in the presence of, as catalyst, titanium tetrahalide and a metal selected from the group consisting of aluminum, boron, iron and zirconium.

20. A process for alkylating as alkylatable hydrocarbon which comprises alkylating said hydrocarbon with an olefin hydrocarbon having from 2 to 18 carbon atoms at alkylating conditions in the presence of, as catalyst, titanium tetrahalide and a metal selected from the group consisting of aluminum, boron, iron and zirconium.

References Cited in the file of this patent

UNITED STATES PATENTS

| | | |
|---|---|---|
| 2,265,548 | Schuit | Dec. 9, 1941 |
| 2,265,870 | Schuit | Dec. 9, 1941 |
| 2,271,956 | Ruthruff | Feb. 3, 1942 |
| 2,426,693 | Kiersted | Sept. 2, 1947 |
| 2,824,145 | McCall et al. | Feb. 18, 1958 |

OTHER REFERENCES

Callaway: Chemical Reviews, vol. 17 (1935); pp. 327–82 (page 375 only relied on).

Grosse: Journal of Organic Chemistry, vol. 2 (1937), pp. 559–66 (page 560 only relied on).

Cullinane et al.: Chemical Society Journal, August 1954, part 3, pp. 2942–47.